United States Patent
Segawa et al.

(10) Patent No.: US 12,181,731 B2
(45) Date of Patent: Dec. 31, 2024

(54) OPTICAL SYSTEM AND IMAGING DEVICE INCLUDING TWO LENS GROUPS OF −+ REFRACTIVE POWERS

(71) Applicant: TAMRON CO., LTD., Saitama (JP)

(72) Inventors: Toshiya Segawa, Saitama (JP); Yuki Mori, Saitama (JP); Hirofumi Tabata, Saitama (JP)

(73) Assignee: Tamron Co., Ltd., Saitama (JP)

( * ) Notice: Subject to any disclaimer, the term of this patent is extended or adjusted under 35 U.S.C. 154(b) by 734 days.

(21) Appl. No.: 17/479,365

(22) Filed: Sep. 20, 2021

(65) Prior Publication Data

US 2022/0163766 A1  May 26, 2022

(30) Foreign Application Priority Data

Nov. 20, 2020  (JP) ................. 2020-193249

(51) Int. Cl.
  *G02B 15/14*  (2006.01)
  *G02B 9/64*  (2006.01)
(52) U.S. Cl.
  CPC ........... *G02B 9/64* (2013.01); *G02B 15/1425* (2019.08)
(58) Field of Classification Search
  CPC .............................................. G02B 15/1425
  See application file for complete search history.

(56) References Cited

U.S. PATENT DOCUMENTS 10,690,893 B2  6/2020  Kunugise et al.
2017/0045720 A1*  2/2017  Okumura ....... G02B 15/143507

FOREIGN PATENT DOCUMENTS

JP  2004-245967 A  9/2004
JP  2019-053236 A  4/2019

* cited by examiner

*Primary Examiner* — Wen Huang
(74) *Attorney, Agent, or Firm* — Paratus Law Group, PLLC

(57) ABSTRACT

There are provided an optical system and an imaging device including the same. The optical system includes: in order from an object side to an image side, a first lens group having refractive power; and a second lens group having positive refractive power. A variable distance that varies during focusing between the first lens group and the second lens group is closer to an object than a variable distance that varies during focusing between other lenses. The first lens group includes a positive lens and at least one or more negative lenses in order from the image side. The second lens group includes a lens subgroup 2A having positive refractive power, an aperture stop, and a lens subgroup 2B having positive refractive power in order from the object side. The lens subgroup 2B includes a negative lens and a positive lens in order from the object side and satisfies a predetermined Conditional Expression.

9 Claims, 7 Drawing Sheets

OPTICAL SYSTEM AND IMAGING DEVICE INCLUDING TWO LENS GROUPS OF −+ REFRACTIVE POWERS

CROSS-REFERENCE TO RELATED APPLICATIONS

This application is based on and claims the benefit of priority from Japanese Patent Application No. 2020-193249, filed on Nov. 20, 2020, the entire contents of which are incorporated herein by reference.

BACKGROUND OF THE INVENTION

Technical Field

The present invention relates to an optical system and an imaging device.

Related Art

In the related art, imaging devices have been used in various fields such as single lens reflex cameras, digital cameras, video cameras, security cameras, and industrial cameras. In any field, with an increase in the number of pixels of an image sensor, there is a need for a bright and high-resolution optical system. In recent years, industrial cameras, particularly, those for machine vision (FA/MV) connected to image analysis devices and used for inspection by image analysis and the like have grown in importance. Particularly, attention has been focused on an industrial camera that enables sensing of not only the external structure but also the inside of an object by light rays in a wide wavelength region from the visible light region to the near infrared region. Such an imaging device is required to have an optical system with high imaging performance that well corrects aberrations in a wide wavelength region from the visible light region to the near infrared region.

For example, JP 2004-245967 A discloses a bright optical system including a first lens group having negative refractive power and a second lens group having positive refractive power in order from the object side. This optical system has an F value of about 1.4.

In addition, JP 2019-53236 A discloses a relatively bright optical system including a first lens group having refractive power and a second lens group having positive refractive power in order from the object side. This optical system has an F value of about 2.8.

However, the optical systems disclosed in JP 2004-245967 A and JP 2019-53236 A do not provide good correction of various aberrations in the entire region from the visible light region to the near infrared region.

Accordingly, an object of the present invention is to provide an optical system and an imaging device which have high imaging performance and well correct various aberrations in the entire region from the visible light region to the near infrared region.

SUMMARY OF THE INVENTION

In order to solve the problem, an optical system according to the present invention includes: in order from an object side to an image side, a first lens group having refractive power; and a second lens group having positive refractive power, in which a variable distance that varies during focusing between the first lens group and the second lens group is closer to an object than a variable distance that varies during focusing between other lenses, the first lens group includes a positive lens and at least one or more negative lenses in order from the image side, and the second lens group includes a lens subgroup 2A having positive refractive power, an aperture stop, and a lens subgroup 2B having positive refractive power in order from the object side and also includes at least one or more negative lenses satisfying the following Conditional Expressions (1) and (2), the lens subgroup 2B including a negative lens and a positive lens in order from the object side, satisfying the following Conditional Expressions (3) and (4):

$$\theta ct \geq 0.800 \quad (1)$$

$$vd \leq 55 \quad (2)$$

$$nd\_pave < 1.70 \quad (3)$$

$$vd\_pave > 50 \quad (4)$$

where
θct is a partial dispersion ratio of a negative lens included in the second lens group at the wavelength of the C line to the wavelength of the t line.

Note that the partial dispersion ratio θct at the wavelength of the C line to the wavelength of the t line is defined by the following Expression:

$$\theta ct = (nC - nt)/(nF - nC)$$

where nC is a refractive index at the wavelength of the C line,
nt is a refractive index at the wavelength of the t line,
nF is a refractive index at the wavelength of the F line,
vd is an Abbe number of a negative lens included in the second lens group at the wavelength of the d line,
nd_pave is an average refractive index of all positive lenses disposed in the lens subgroup 2B at the wavelength of the d line, and
vd_pave is an average Abbe number of all positive lenses disposed in the lens subgroup 2B at the wavelength of the d line.

To solve the problem, an imaging device according to the present invention includes the aforementioned optical system and an image sensor that converts an optical image formed by the optical system into an electrical signal.

According to the present invention, there are provided an optical system and an imaging device which have high imaging performance and well correct various aberrations in the entire region from the visible light region to the near infrared region.

DESCRIPTION OF THE EMBODIMENTS

Hereinafter, embodiments of an optical system and an imaging device according to the present invention will be described. However, the following optical system and imaging device are one aspect of the optical system and the imaging device according to the present invention, and the optical system and the imaging device according to the present invention are not limited to the following aspect.

1. Optical System 1-1. Optical Configuration

The optical system includes in order from an object side to an image side, a first lens group having refractive power and a second lens group having positive refractive power. A variable distance that varies during focusing between the first lens group and the second lens group is closer to an object than a variable distance that varies during focusing between other lenses. Furthermore, in the optical system, the first lens group includes a positive lens and at least one or more negative lenses in order from the image side. The second lens group includes a lens subgroup 2A having positive refractive power, an aperture stop, and a lens subgroup 2B having positive refractive power in order from the object side. In addition, the lens subgroup 2B includes a negative lens and a positive lens in order from the object side. With such an optical configuration, satisfying at least one of the following Conditional Expressions makes it possible to obtain an optical system with high imaging performance that well corrects aberrations from the visible light region to the near infrared region.

(1) First Lens Group

As long as the first lens group has refractive power and includes at least two lenses, that is, a positive lens and a negative lens in order from the image side, the first lens group may include another lens on the object side of the negative lens. For example, when a positive lens is disposed closest to the object side of the first lens group, it is preferable in that such a configuration enables good correction of distortion while a wide angle of view is ensured. The refractive power of the first lens group may be positive or negative, but negative is more preferable from a view point of achieving a wide angle of view.

(2) Second Lens Group

The second lens group is disposed on the image side of the first lens group across the variable distance closest to the object side that varies during focusing. Herein, distances between lenses which change during focusing are referred to as "variable distances that vary during focusing." The "variable distance closest to the object side that varies during focusing" refers to a distance closest to the object side among "variable distances that vary during focusing" in the optical system. Therefore, the second lens group includes all the lenses disposed closer to the image side than the variable distance closest to the object side that varies during focusing.

The second lens group preferably includes the lens subgroup 2A having positive refractive power, the aperture stop, and the lens subgroup 2B having positive refractive power in order from the object side. Furthermore, the second lens group may include "variable distances that vary during focusing." For example, another group or other groups having positive or negative refractive power may be disposed on the image side of the lens subgroup 2B across the variable distances that vary during focusing. In addition, a distance between the lens subgroup 2A and the lens subgroup 2B may not be changed or may be changed during focusing. However, regardless of the presence or absence of the variable distances that vary during focusing, the second lens group preferably includes the lens subgroup 2A and the lens subgroup 2B, thereby facilitating scale-down of the optical system.

As long as the lens subgroup 2A has positive refractive power as a whole, the lens subgroup 2A is not particularly limited to a specific lens configuration and preferably includes at least one or more positive lenses. As long as the lens subgroup 2B has positive refractive power as a whole and includes a negative lens and a positive lens in order from the object side, the lens subgroup 2B is not particularly limited to a specific lens configuration.

1-2. Operation

In the optical system, one or more lens groups are moved along an optical axis in order to focus from an object at infinity to an object at a short distance. For example, the first lens group may be moved along the optical axis for focusing. A lens group to be moved during focusing is not particularly limited. However, the optical system preferably performs focusing from an object at infinity to an object at a short distance by moving the second lens group along the optical axis or moving the lens subgroup 2A and the lens subgroup 2B along the optical axis on different paths. Focusing by the entire second lens group enables a simple configuration of a drive mechanism for focusing. Such a configuration is preferable in reducing the overall size and weight of the optical system. Furthermore, focusing by the entire second lens group disposed on the image side makes it possible to prevent variations in various aberrations and in angles of view. Accordingly, it is possible to obtain good imaging performance regardless of an object position from an object at infinity to an object at a short distance. On the other hand, focusing by both the lens subgroup 2A and the lens subgroup 2B reduces a distance which each group travels during focusing. Accordingly, it is easier to downsize the optical system in a direction of the optical axis. In this case, it is preferable that the second lens group includes the lens subgroup 2A and the lens subgroup 2B so that the optical system can be easily downsized in the direction of the optical axis. Note that it is more preferable to fix the first lens group in the direction of the optical axis during focusing.

1-3. Conditional Expression

With the aforementioned configuration, the optical system preferably satisfies at least one of the following Conditional Expressions.

1-3-1. Conditional Expression (1) and Conditional Expression (2)

The second lens group preferably includes at least one or more negative lenses satisfying the following Conditional Expression:

$$\theta ct \geq 0.800 \tag{1}$$

$$vd \leq 55 \tag{2}$$

where

θct is a partial dispersion ratio of a negative lens included in the second lens group at the wavelength of the C line to the wavelength of the t line.

Note that the partial dispersion ratio θct at the wavelength of the C line to the wavelength of the t line is defined by the following Expression:

$$\theta ct = (nC - nt)/(nF - nC)$$

nC is a refractive index at the wavelength of the C line (656.2800 nm),
nt is a refractive index at the wavelength of the t line (1013.9800 nm),
nF is a refractive index at the wavelength of the F line (486.1300 nm), and
vd is an Abbe number of a negative lens included in the second lens group at the wavelength of the d line.

Conditional Expression (1) defines a partial dispersion ratio of a glass material at the wavelength of the C line to the wavelength of the t line. Conditional Expression (2) defines an Abbe number of a glass material at the wavelength of the d line. When the second lens group includes a negative lens made of a glass material satisfying Conditional Expressions (1) and (2), it is possible to well correct a chromatic aberration from the visible light region to the near infrared region.

In order to obtain the above effect, the lower limit of Conditional Expression (1) is more preferably 0.810 and still more preferably 0.815. The upper limit of Conditional Expression (2) is more preferably 53. When these preferable lower limits or upper limits are employed, a strict inequality sign (<) may be replaced with an inequality sign (≦) in Conditional Expression (1). The same applies to other Expressions in principle. In other Expressions, an inequality sign (≦) may be replaced with a strict inequality sign (<).

1-3-2. Conditional Expression (3) and Conditional Expression (4)

The positive lens disposed in the lens subgroup 2B preferably satisfies the following Conditional Expression:

$$\text{nd\_pave} < 1.70 \tag{3}$$

$$\text{vd\_pave} > 50 \tag{4}$$

where
nd_pave is an average refractive index of all positive lenses disposed in the lens subgroup 2B at the wavelength of the d line, and
vd_pave is an average Abbe number of all positive lenses disposed in the lens subgroup 2B at the wavelength of the d line.

Conditional Expression (3) defines an average Abbe number of the positive lenses included in the second lens group at the wavelength of the d line. Conditional Expression (4) defines an average refractive index of the positive lenses included in the second lens group at the wavelength of the d line. When a positive lens made of a glass material satisfying both Conditional Expression (3) and Conditional Expression (4) is disposed in the second lens group, it is possible to prevent dispersion caused by the positive lens in the second lens group from becoming too large and to well correct a chromatic aberration from the visible light region to the near infrared light region.

In order to obtain the above effect, the upper limit of Conditional Expression (3) is more preferably 1.67. The lower limit of Conditional Expression (4) is more preferably 55 and still more preferably 63.

1-3-3. Conditional Expression (5)

It is preferable that a negative lens disposed closest to the object side in the lens subgroup 2B satisfies the following Conditional Expression:

$$-0.007 < 0.00558 \times \text{vd\_n2B} + 0.531 - \theta ct\_n2B < 0.000 \tag{5}$$

where
vd_n2B is an Abbe number of the negative lens disposed closest to the object side in the lens subgroup 2B at the wavelength of the d line, and
θct_n2B is a partial dispersion ratio of the negative lens disposed closest to the object side in the lens subgroup 2B at the wavelength of the C line to the wavelength of the t line.

Conditional Expression (5) defines a glass material of the negative lens disposed closest to the object side in the lens subgroup 2B. When the negative lens disposed closest to the object side in the lens subgroup 2B is a glass material lens satisfying Conditional Expression (5), it is easier to well correct a chromatic aberration from the visible light region to the near infrared light region. In addition, when this negative lens disposed immediately after the aperture stop is made of such a glass material, the chromatic aberration can be corrected effectively, compared to a case where other lenses are made of the glass material.

In order to obtain the above effect, the lower limit of Conditional Expression (5) is preferably −0.006 and more preferably −0.005.

1-3-4. Conditional Expression (6)

It is preferable that a positive lens disposed closest to the object side in the lens subgroup 2A satisfies the following Conditional Expression:

$$0.623 < \theta gF\_p2A \tag{6}$$

where
θgF_p2A is a partial dispersion ratio of a positive lens disposed closest to the object side in the lens subgroup 2A at the wavelength of the g line to the wavelength of the F line.

Note that the partial dispersion ratio θgF at the wavelength of the g line to the wavelength of the F line is defined by the following Expression:

$$-0.050 < \theta IRp - \theta IRn < 0.050 \tag{7}$$

ng is a refractive index at the wavelength of the g line (435.8400 nm).

Conditional Expression (6) defines a glass material of the positive lens disposed closest to the object side in the lens subgroup 2A. When the positive lens disposed closest to the object side in the lens subgroup 2A is a glass material lens satisfying Conditional Expression (6), it is possible to well correct a chromatic aberration particularly for light having a wavelength on the short wavelength side among light having wavelengths in the visible light region.

In order to obtain the above effect, the lower limit of Conditional Expression (6) is preferably 0.625 and more preferably 0.630.

1-3-5. Conditional Expression (7)

$$\theta gF = (ng - nF)/(nF - nC)$$

where

θIRp is an average of (nF−nd)/(n1700 nm−nd) of all positive lenses included in the second lens group, θIRn is an average of (nF−nd)/(n1700 nm−nd) of all negative lenses included in the second lens group, and n1700 nm is a refractive index at a wavelength of 1700 nm.

Conditional Expression (7) is an expression relating to dispersion characteristics of the positive lenses and the negative lenses included in the second lens group. Satisfying Conditional Expression (7) enables good correction of a chromatic aberration in the entire region from the visible light region to the near infrared region. Accordingly, it is possible to obtain an optical system having high imaging performance which enables good correction of various aberrations in the entire region from the visible light region to the near infrared region. The value of Conditional Expression (7) may be 0.

On the other hand, when the value of Conditional Expression (7) is equal to the upper limit or more or equal to the lower limit or less, it is difficult to correct the chromatic aberration well in the entire region from the visible light region to the near infrared region. Accordingly, even when the chromatic aberration is well corrected in the visible light region, the chromatic aberration correction in the near infrared region is poor or excessive. Conversely, even when the chromatic aberration is well corrected in the near infrared region, the chromatic aberration correction in the visible light region is poor or excessive. Both cases are not preferable.

In order to obtain the above effect, the lower limit of Conditional Expression (7) is more preferably −0.040 and still more preferably −0.030. The upper limit of Conditional Expression (7) is more preferably 0.040 and still more preferably 0.030.

1-3-6. Conditional Expression (8)

$$1.50 < F2/F < 2.60 \tag{8}$$

where

F2 is a focal length of the second lens group at the wavelength of the d line, and F is a focal length of the optical system at the wavelength of the d line.

Conditional Expression (8) defines a ratio of the focal length of the second lens group to the focal length of the optical system. Satisfying Conditional Expression (8) enables good correction of a chromatic aberration in the entire region from the visible light region to the near infrared region and enables good correction of various aberrations such as field curvature and astigmatism. Accordingly, it is easier to obtain an optical system having high imaging performance.

On the other hand, when this numerical value is equal to the lower limit or less, the refractive power of the second lens group becomes strong, which makes it difficult to well correct the chromatic aberration, field curvature, and astigmatism in the entire region from the visible light region to the near infrared region. Accordingly, it becomes difficult to obtain an optical system having high imaging performance. On the other hand, when this numerical value is equal to the upper limit or more, the refractive power of the second lens group becomes weak, which makes it difficult to achieve a large lens aperture and a small size.

In order to obtain the above effect, the lower limit of Conditional Expression (8) is more preferably 1.70 and still more preferably 1.85. The upper limit of Conditional Expression (8) is more preferably 2.50 and still more preferably 2.40.

1-3-7. Conditional Expression (9)

$$1.50 < F2B/F < 2.60 \tag{9}$$

where

F2B is a focal length of the lens subgroup 2B at the wavelength of the d line.

Conditional Expression (9) defines a ratio of the focal length of the lens subgroup 2B to the focal length of the optical system at the wavelength of the d line. Satisfying Conditional Expression (9) enables good correction of various aberrations such as spherical aberration and chromatic aberration. Accordingly, it becomes easier to achieve an optical system having high imaging performance in a wide wavelength region from the visible light region to the near infrared region.

On the other hand, when this numerical value is equal to the lower limit or less, the refractive power of the lens subgroup 2B becomes strong, and correction of various aberrations, mainly the spherical aberration and chromatic aberration, become excessive. Accordingly, it is difficult to obtain an optical system having high imaging performance in the entire region from the visible light region to the near infrared region. On the other hand, when this numerical value is equal to the upper limit or more, the refractive power of the lens subgroup 2B becomes weak, causing difficulty in well correcting the spherical aberration and chromatic aberration.

In order to obtain the above effect, the lower limit of Conditional Expression (9) is preferably 1.70 and more preferably 1.85. The upper limit of Conditional Expression (9) is preferably 2.50 and more preferably 2.40.

2. Imaging Device

Hereinafter described is the imaging device according to the present invention. The imaging device according to the present invention includes the optical system according to the present invention and an image sensor that converts an optical image formed by the optical system into an electrical signal. Note that the image sensor is preferably disposed on the image side of the optical system.

Herein, the optical system according to the present invention has good imaging performance in a wide wavelength region from the visible light region to the near infrared region. As the image sensor, preferable examples include not only an image sensor for the visible light region having sensitivity to light rays with wavelengths in the visible light region such as a charge coupled device (CCD) sensor or a complementary metal oxide semiconductor (CMOS) sensor but also a short wave infrared (SWIR) sensor having sensitivity to light rays with wavelengths in the near infrared region. Particularly, it is preferable to use an image sensor having sensitivity to light rays in the entire wavelength region from the visible light region to the near infrared region (for example, 400 nm to 1700 nm) and the optical system according to the present invention, because it is possible to achieve an industrial camera that enables sensing of not only the external structure but also the inside of an object by light rays from the visible light region to the near infrared region with one imaging device, and there is no need to use two imaging devices, an imaging device for the visible light and an imaging device for the near infrared light, as in the related art. Note that the imaging device according to the present invention is not limited to industrial cameras used for, for example, material selection, foreign body inspection, and semiconductor inspection and can be applied to imaging devices for various uses such as security cameras, in-vehicle cameras, and cameras mounted on drones.

Figure 7:
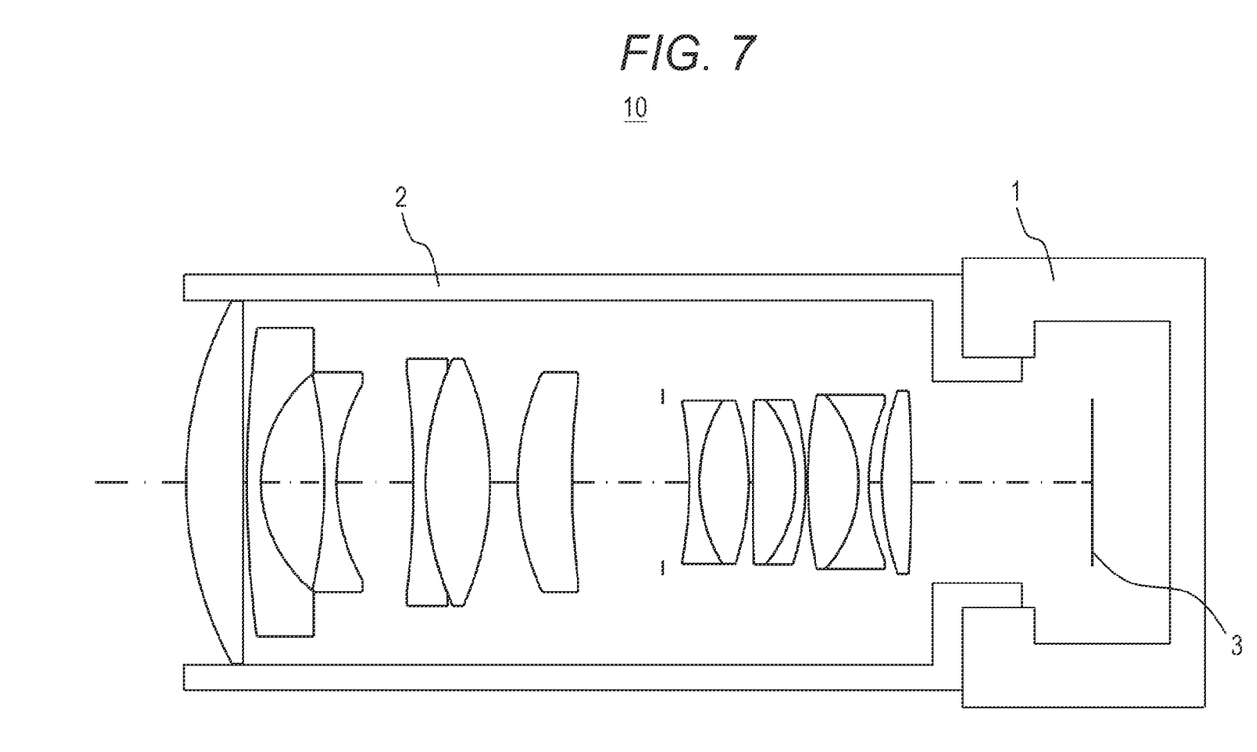
FIG. 7 schematically shows an example of a configuration of an imaging device according to an embodiment of the present invention.

FIG. 7 schematically shows an example of a configuration of an imaging device 10. The imaging device 10 includes an imaging device main body 1, a lens barrel 2 detachable from the imaging device main body 1, and an image sensor 3 disposed on an image plane IP of an optical system. The lens barrel 2 contains, for example, the optical system according to the present invention and a drive mechanism for driving a lens group during focusing.

Next, the present invention will be described in detail with reference to Examples. However, the present invention is not limited to the following Examples.

Example 1

(1) Optical Configuration

Figure 1:
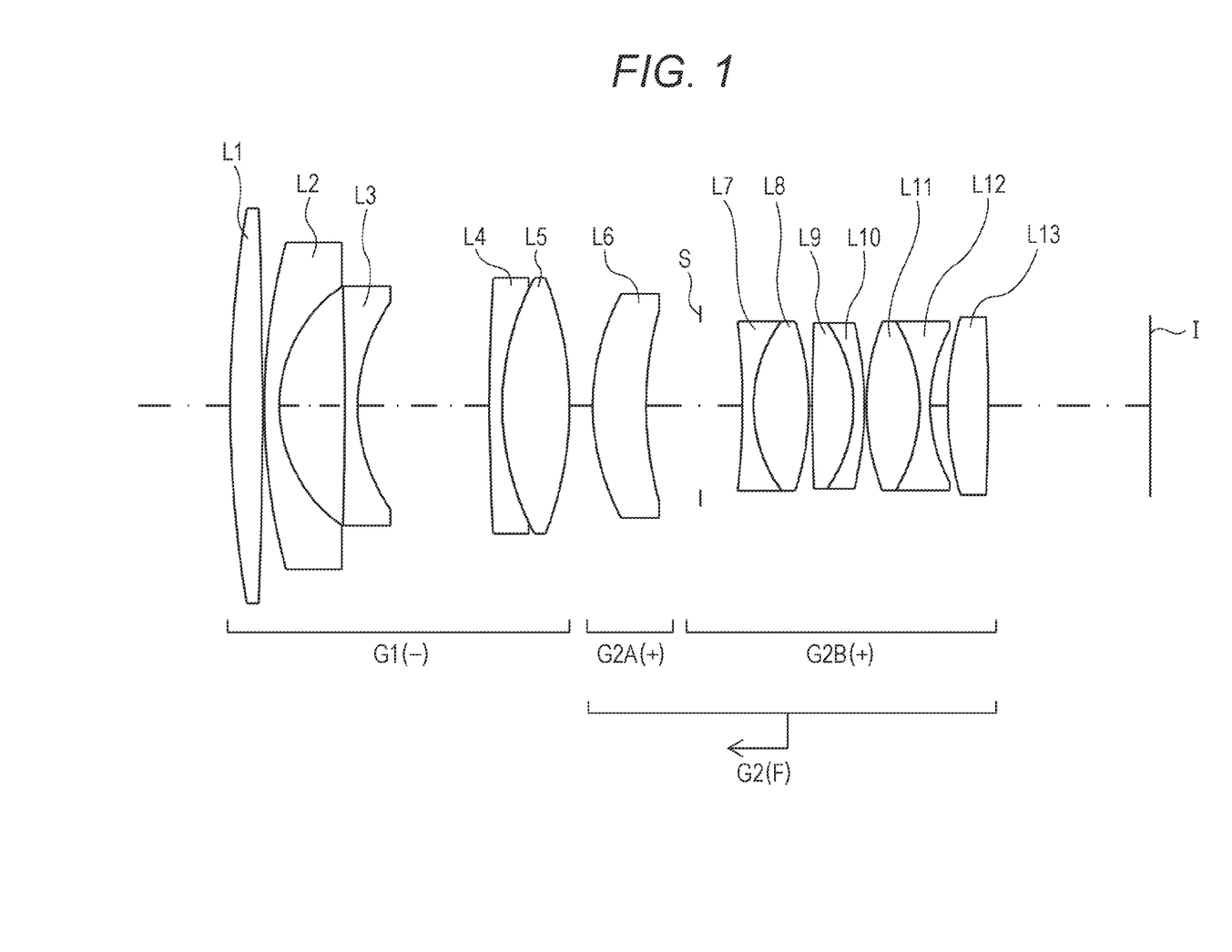
FIG. 1 is a cross-sectional view of an optical system of Example 1.

FIG. 1 is a cross-sectional view of an optical system of Example 1 according to the present invention at infinity focus. The optical system includes in order from an object side to an image side, a first lens group G1 having negative refractive power and a second lens group G2 having positive refractive power. A variable distance that varies during focusing between the first lens group G1 and the second lens group G2 is closer to an object than a variable distance that varies during focusing between other lenses. The second lens group G2 includes a lens subgroup 2A G2A having positive refractive power, an aperture stop S, and a lens subgroup 2B G2B having positive refractive power in order from the object side. The optical system performs focusing from an object at infinity to an object at a short distance by moving the entire second lens group G2 to the object side along an optical axis. The first lens group G1 is fixed in a direction of the optical axis during focusing. Hereinafter, a configuration of each lens group will be described.

The first lens group G1 includes, in order from the object side, a bi-convex lens L1, a negative meniscus lens L2 with a convex surface on the object side, a bi-concave lens L3, and a cemented lens in which a negative meniscus lens L4 with a convex surface on the object side and a bi-convex lens L5 are cemented.

Next, a configuration of second lens group G2 will be described. The lens subgroup 2A G2A includes a positive meniscus lens L6 with a convex surface on the object side. The lens subgroup 2B G2B includes a cemented lens in which a bi-concave lens L7 and a bi-convex lens L8 are cemented, a cemented lens in which a bi-convex lens L9 and a negative meniscus lens L10 with a concave surface on the object side are cemented, a cemented lens in which a bi-convex lens L11 and a bi-concave lens L12 are cemented, and a bi-convex lens L13.

Note that, in FIG. 1, "I" represents an image plane and specifically represents an imaging plane of an image sensor such as an SWIR sensor, a CCD sensor, and a CMOS sensor or represents a film plane of a silver salt film or the like. The SWIR sensor preferably has sensitivity to light with wavelengths from the visible light region to the near infrared region. This point also applies to the cross-sectional views of lenses shown in other Examples, and the description thereof will be omitted below.

(2) Numerical Data Examples

Hereinafter described are Numerical Data Examples to which specific numerical values of the optical system are applied. "Lens Data," "Specifications," and "Lens Group Data" are shown below. In addition, values of each Expression (Table 1) are collectively shown after Example J.

In (Lens Data), "Surface NO." represents the order of a lens surface counted from the object side, "r" represents a radius of curvature of a lens surface, "d" represents a lens wall thickness or an air gap on the optical axis, "Nd" represents a refractive index at the wavelength of the d line ($\lambda$=587.5618 nm), "vd" represents an Abbe number at the wavelength of the d line, "θgF" represents a partial dispersion ratio ((ng−nF)/(nF−nC)) at the wavelength of the g line to the wavelength of the F line, "θCT" represents a partial dispersion ratio ((nC−nt)/(nF−nC)) at the wavelength of the C line to the wavelength of the t line, and "θIR" represents a value of "(nF−nd)/(n1700 nm−nd)." In the column of "d," "D(9)" and "D(23)" indicate that a distance on the optical axis between each of the corresponding lens surfaces and an adjacent lens surface is a variable distance that changes during focusing. In the column of the radius of curvature, "INF" represents "infinity" and indicates that the corresponding lens surface is flat.

In (Specifications), "F" represents a focal length of the optical system, "Fno" represents a F value, "c)" represents a half angle of view, and "D(9)" and "D(23)" represent the aforementioned variable distances. The table shows values at the time of focusing the object at infinity (INF) and at the time of focusing the object at a short distance (object distance 0.2 m).

(Lens Group Data) shows focal lengths of the first lens group G1, the second lens group G2, the lens subgroup 2A G2A, and the lens subgroup 2B G2B.

The items in each of these tables also apply to the tables shown in other Examples, and the description thereof will be omitted below.

Figure 2:
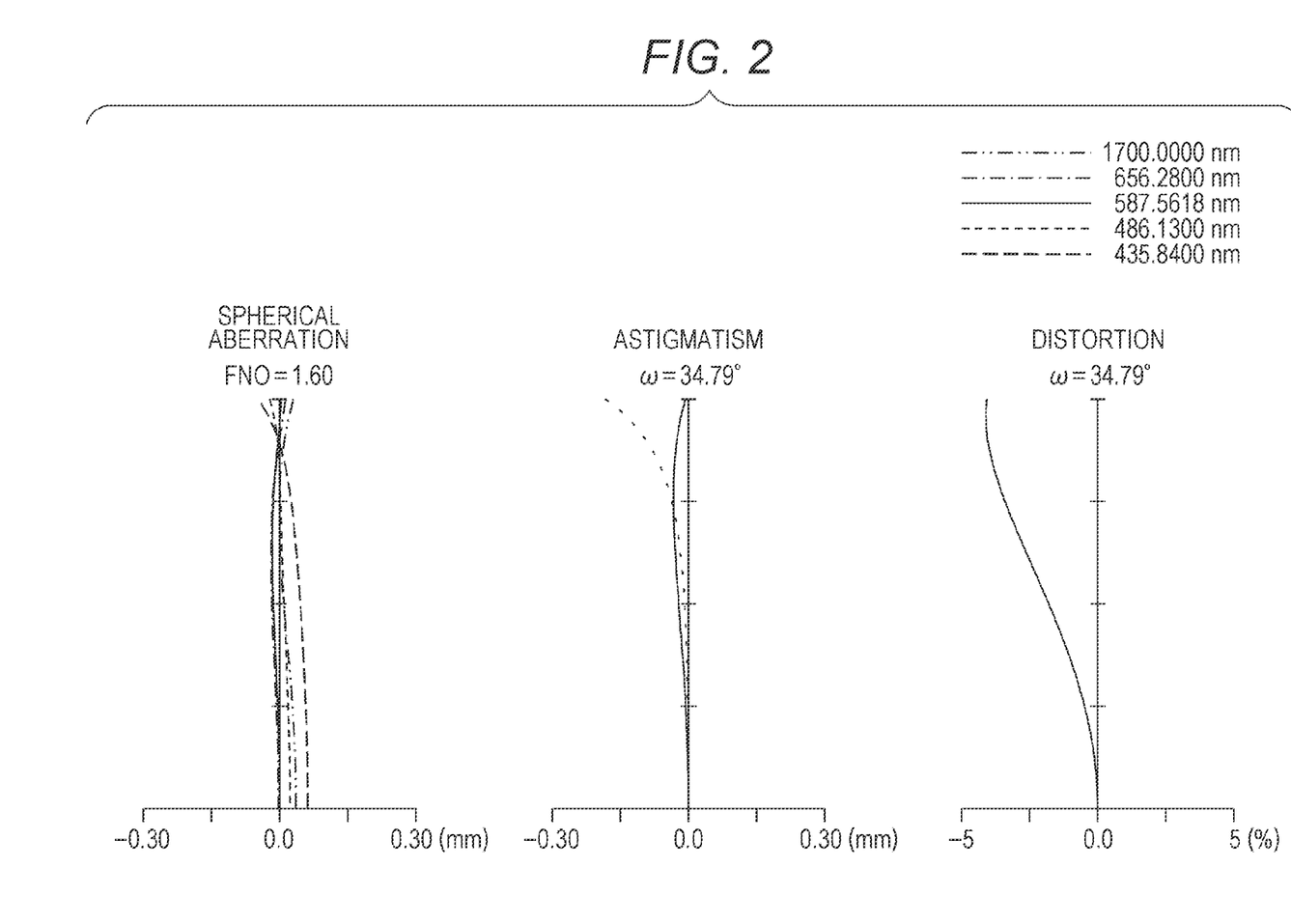
FIG. 2 is an aberration diagram of the optical system of Example 1.

FIG. 2 shows a longitudinal aberration diagram of the optical system at infinity focus. The longitudinal aberration diagram illustrated in each drawing shows spherical aberration (mm), astigmatism (mm), and distortion (%) in order from the left side. In the spherical aberration diagram, the dash double-dotted line represents the spherical aberration of light having a wavelength of 1700 nm, the dash-dot line represents the spherical aberration of the C line (656.2800 nm), the solid line represents the spherical aberration of the d line (wavelength 587.5618 nm), the short dash line represents the spherical aberration of the F line (wavelength 486.1300 nm), and the long dash line represents the spherical aberration of the g line (wavelength 435.8400 nm). In the astigmatism diagram, the half angle of view (w) is taken along the ordinate, and the defocus is taken along the abscissa. The solid line represents the sagittal image plane at the wavelength of the d line, and the broken line represents the meridional image plane at the wavelength of the d line. In the distortion diagram, the half angle of view (o) is taken along the ordinate, and the distortion is taken along the abscissa. These items also apply to each aberration diagram shown in other Examples, and the description thereof will be omitted below.

| Surface | (Lens Data) | | | | | | |
|---|---|---|---|---|---|---|---|
| NO. | r | d | Nd | vd | θgF | θCT | θIR |
| 1 | 108.811 | 3.000 | 1.8040 | 46.53 | 0.56 | 0.77 | −0.39 |
| 2 | −446.594 | 0.161 | | | | | |
| 3 | 56.597 | 1.400 | 1.4970 | 81.54 | 0.54 | 0.83 | −0.35 |
| 4 | 13.272 | 6.082 | | | | | |
| 3 | −356.688 | 1.200 | 1.8929 | 20.36 | 0.64 | 0.65 | −0.53 |
| b | 16.385 | 12.235 | | | | | |
| 7 | 204.061 | 1.200 | 1.5891 | 61.13 | 0.54 | 0.84 | −0.33 |
| 8 | 24.678 | 6.250 | 1.7620 | 40.10 | 0.58 | 0.74 | −0.43 |
| 9 | −31.718 | D(9) | | | | | |
| 10 | 21.216 | 4.970 | 1.8929 | 20.36 | 0.64 | 0.65 | −0.53 |
| 11 | 32.712 | 5.034 | | | | | |
| 12 (Stop) | INF | 3.935 | | | | | |
| 13 | −63.937 | 1.000 | 1.7380 | 32.33 | 0.59 | 0.72 | −0.44 |
| 14 | 12.933 | 5.150 | 1.4970 | 81.54 | 0.54 | 0.83 | −0.35 |
| 15 | −24.439 | 0.300 | | | | | |
| 16 | 156.901 | 3.850 | 1.4970 | 81.54 | 0.54 | 0.83 | −0.35 |
| 17 | −13.080 | 1.000 | 1.8929 | 20.36 | 0.64 | 0.65 | −0.53 |
| 18 | −31.684 | 0.200 | | | | | |
| 19 | 21.061 | 4.930 | 1.5952 | 67.73 | 0.54 | 0.79 | −0.37 |
| 20 | −14.693 | 1.000 | 1.5174 | 52.20 | 0.56 | 0.82 | −0.35 |
| 21 | 14.693 | 1.602 | | | | | |
| 22 | 28.185 | 3.800 | 1.9037 | 31.34 | 0.60 | 0.70 | −0.47 |
| 23 | −142.857 | D(23) | | | | | |

| (Specifications) | | |
|---|---|---|
| | INF | 0.2 m |
| F | 12.000 | — |
| Fno | 1.60 | — |
| ω | 34.79 | — |
| D(9) | 2.141 | 1.486 |
| D(23) | 15.034 | 15.688 |

| (Lens Group Data) | |
|---|---|
| F1 | −302.112 |
| F2 | 28.160 |
| F2A | 56.162 |
| F2B | 26.351 |

Example 2

(1) Optical Configuration

Figure 3:
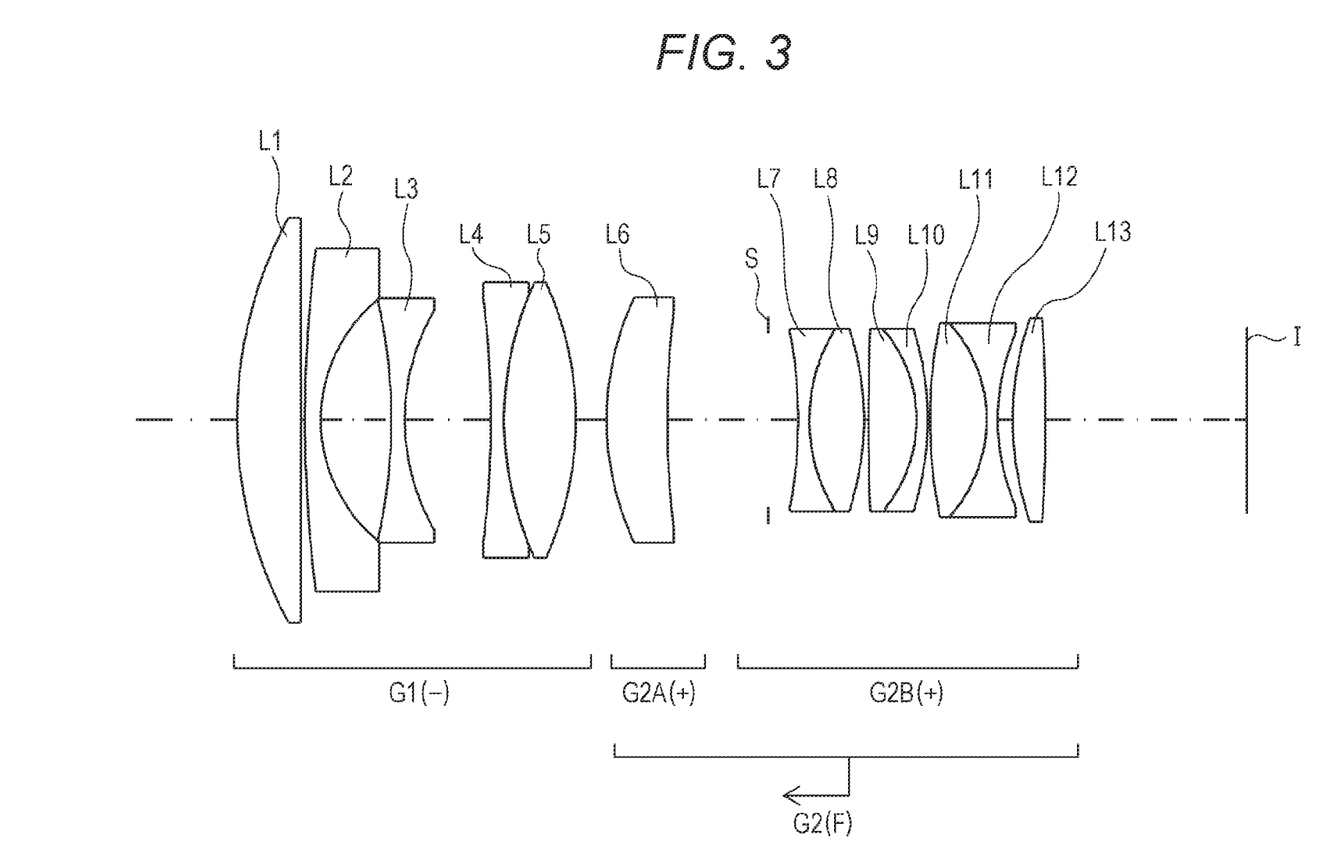
FIG. 3 is a cross-sectional view of an optical system of Example 2.

FIG. 3 is a cross-sectional view of an optical system of Example 2 according to the present invention at infinity focus. The optical system includes in order from an object side to an image side, a first lens group G1 having negative refractive power and a second lens group G2 having positive refractive power. A variable distance that varies during focusing between the first lens group G1 and the second lens group G2 is closer to an object than a variable distance that varies during focusing between other lenses. The second lens group G2 includes a lens subgroup 2A having positive refractive power, an aperture stop S, and a lens subgroup 2B having positive refractive power in order from the object side. The optical system performs focusing from an object at infinity to an object at a short distance by moving the entire second lens group G2 to the object side along an optical axis. Hereinafter, a configuration of each lens group will be described.

The first lens group G1 includes, in order from the object side, a bi-convex lens L1, a negative meniscus lens L2 with a convex surface on the object side, a bi-concave lens L3, and a cemented lens in which a bi-concave lens L4 and a bi-convex lens L5 are cemented.

Next, a configuration of second lens group G2 will be described. The lens subgroup 2A G2A includes a positive meniscus lens L6 with a convex surface on the object side. The lens subgroup 2B G2B includes a cemented lens in which a bi-concave lens L7 and a bi-convex lens L8 are cemented, a cemented lens in which a bi-convex lens L9 and a negative meniscus lens L10 with a concave surface on the object side are cemented, a cemented lens in which a bi-convex lens L11 and a bi-concave lens L12 are cemented, and a bi-convex lens L13.

(2) Numerical Data Examples

Figure 4:
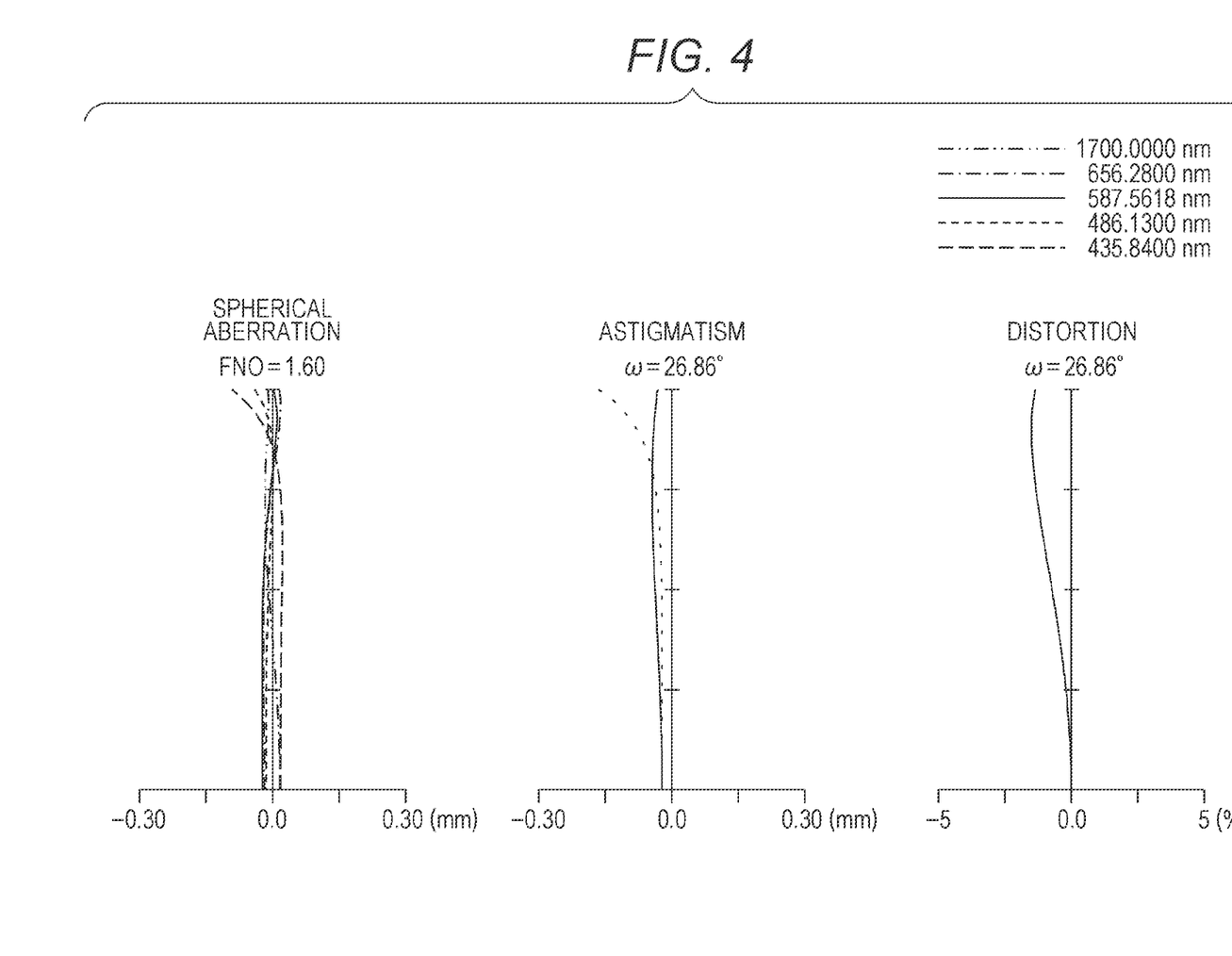
FIG. 4 is an aberration diagram of the optical system of Example 2.

Next, "Lens Data," "Specifications," and "Lens Group Data" will be described as Numerical Data Examples to which specific numerical values of the optical system are applied. FIG. 4 shows a longitudinal aberration diagram of the optical system at infinity focus.

| Surface | (Lens Data) | | | | | | |
|---|---|---|---|---|---|---|---|
| NO. | r | d | Nd | vd | θgF | θCT | θIR |
| 1 | 37.695 | 5.679 | 1.8040 | 46.53 | 0.56 | 0.77 | −0.39 |
| 2 | −3182.289 | 0.380 | | | | | |
| 3 | 122.771 | 1.400 | 1.5163 | 64.14 | 0.54 | 0.87 | −0.31 |
| 4 | 13.804 | 6.287 | | | | | |
| 3 | −47.382 | 1.200 | 1.9229 | 18.90 | 0.65 | 0.64 | −0.54 |
| 6 | 19.501 | 7.665 | | | | | |
| 7 | −88.131 | 1.200 | 1.5163 | 64.14 | 0.54 | 0.87 | −0.31 |
| 8 | 29.255 | 6.385 | 1.7995 | 42.22 | 0.57 | 0.75 | −0.41 |
| 9 | −29.201 | D(9) | | | | | |
| 10 | 25.387 | 5.400 | 1.8929 | 20.36 | 0.64 | 0.65 | −0.53 |
| 11 | 80.878 | 9.028 | | | | | |
| 12 (Stop) | INF | 2.625 | | | | | |
| 13 | −43.464 | 1.000 | 1.7380 | 32.33 | 0.59 | 0.72 | −0.44 |
| 14 | 15.414 | 4.872 | 1.4970 | 81.54 | 0.54 | 0.83 | −0.35 |
| 15 | −25.594 | 0.400 | | | | | |
| 16 | 200.000 | 4.287 | 1.4970 | 81.54 | 0.54 | 0.83 | −0.35 |
| 17 | −12.500 | 1.000 | 1.8929 | 20.36 | 0.64 | 0.65 | −0.53 |
| 18 | −26.107 | 0.200 | | | | | |
| 19 | 42.310 | 5.048 | 1.5952 | 67.73 | 0.54 | 0.79 | −0.37 |
| 20 | −12.839 | 1.000 | 1.5174 | 52.20 | 0.56 | 0.82 | −0.35 |
| 21 | 19.708 | 1.326 | | | | | |
| 22 | 27.166 | 2.922 | 1.9037 | 31.34 | 0.60 | 0.70 | −0.47 |
| 73 | −141.113 | D(23) | | | | | |

| (Specifications) | | |
|---|---|---|
| | INF | 0.2 m |
| F | 16.01 | — |
| Fno | 1.60 | — |
| ω | 26.86 | — |
| D(9) | 2.742 | 1.489 |
| D(23) | 17.790 | 19.043 |

| (Lens Group Data) | |
|---|---|
| F1 | −61.605 |
| F2 | 29.743 |
| F2A | 39.623 |
| F2B | 29.413 |

Example 3

(1) Optical Configuration

Figure 5:
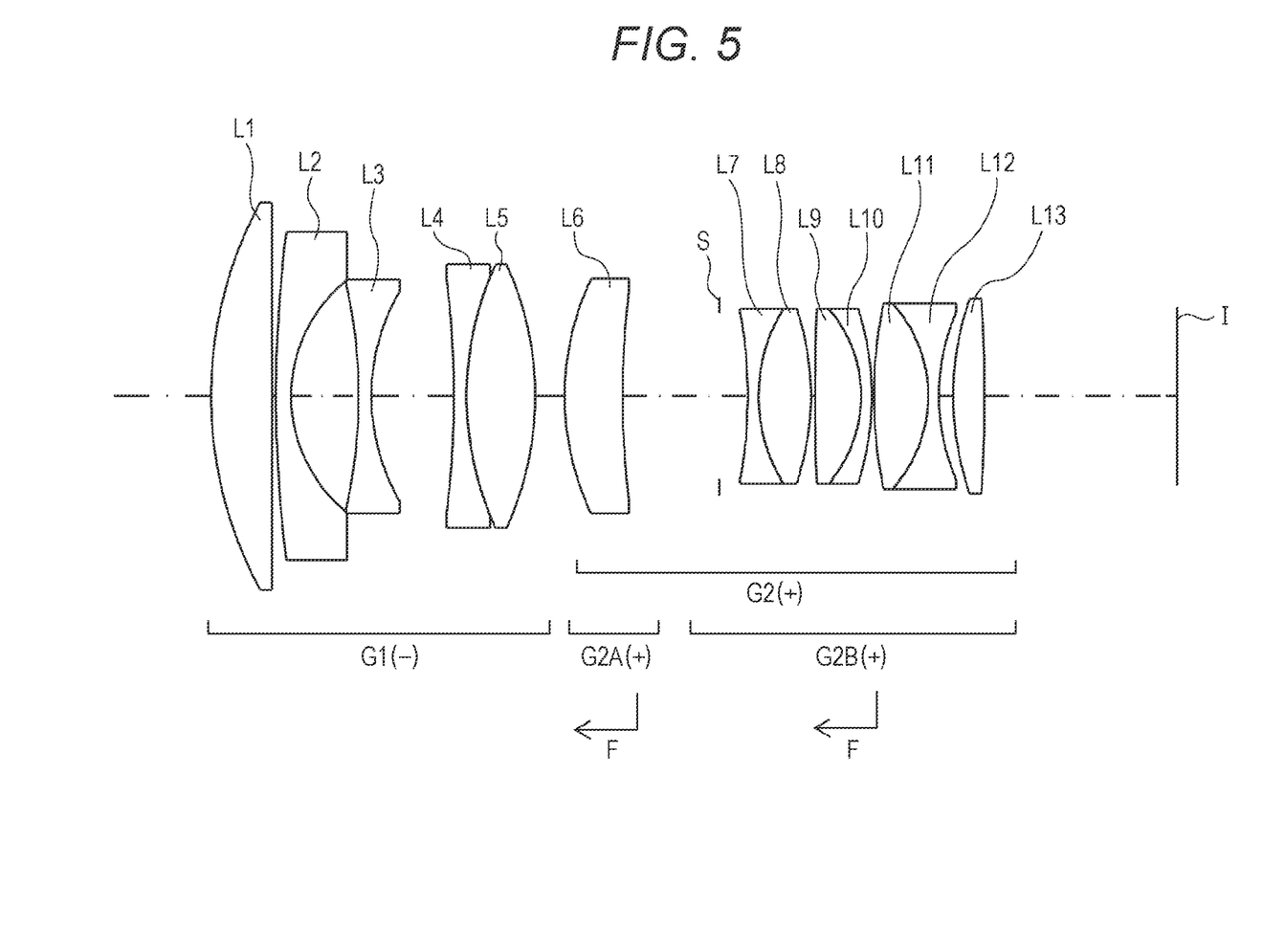
FIG. 5 is a cross-sectional view of an optical system of Example 3.
Figure 6:
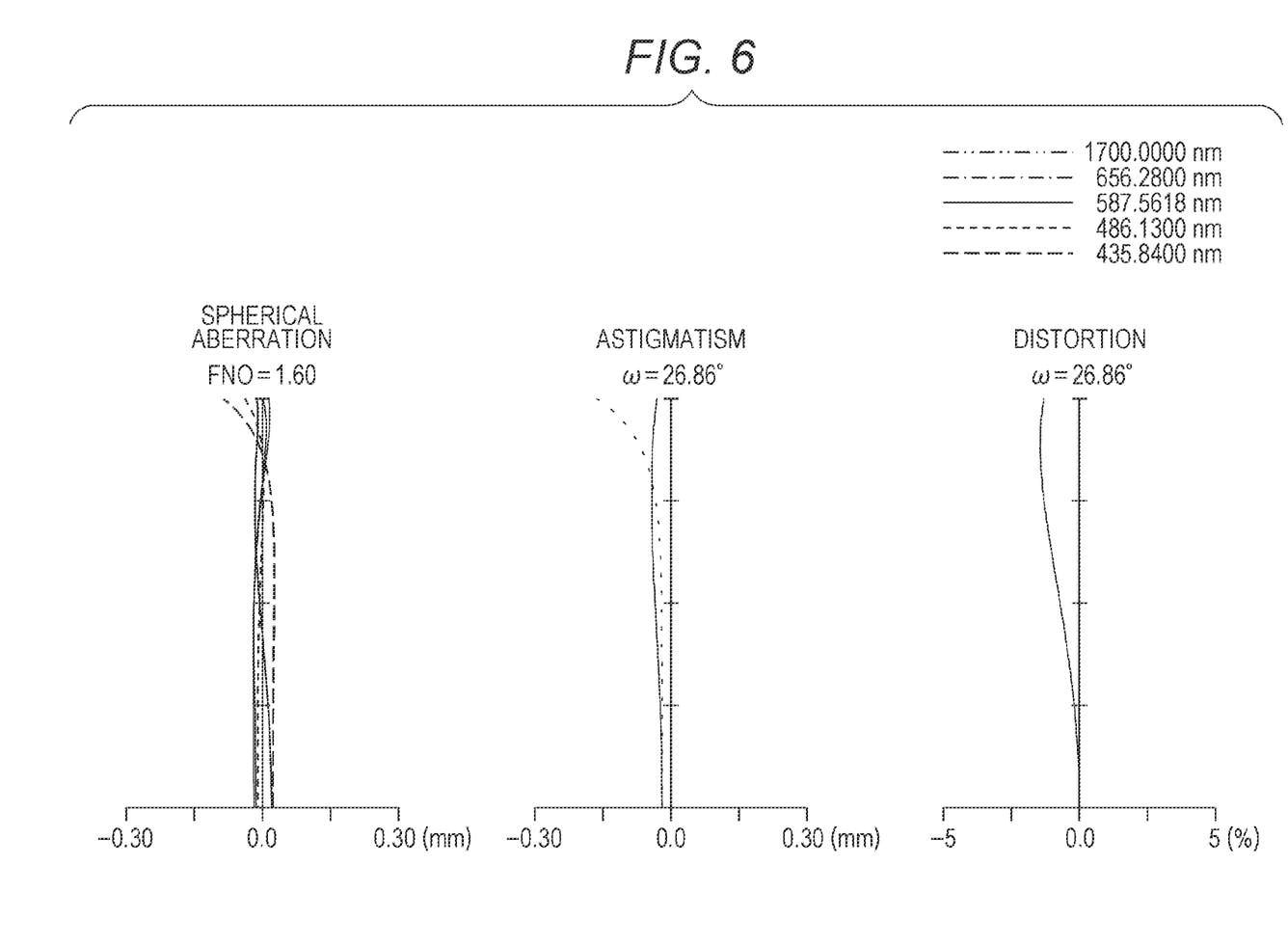
FIG. 6 is an aberration diagram of the optical system of Example 3.

FIG. 5 is a cross-sectional view of an optical system of Example 3 according to the present invention at infinity focus. The optical system includes in order from an object side to an image side, a first lens group G1 having negative refractive power and a second lens group G2 having positive refractive power. A variable distance that varies during focusing between the first lens group G1 and the second lens group G2 is closer to an object than a variable distance that varies during focusing between other lenses. The second lens group G2 includes a lens subgroup 2A having positive refractive power, an aperture stop S, and a lens subgroup 2B having positive refractive power in order from the object side. In the optical system, the lens subgroup 2A G2A and the lens subgroup 2B G2B are moved to the object side along the optical axis on different paths, thereby focusing from an object at infinity to an object at a short distance. Hereinafter, a configuration of each lens group will be described.

The first lens group G1 includes, in order from the object side, a bi-convex lens L1, a negative meniscus lens L2 with a convex surface on the object side, a bi-concave lens L3, and a cemented lens in which a bi-concave lens L4 and a bi-convex lens L5 are cemented.

Next, a configuration of second lens group G2 will be described. The lens subgroup 2A G2A includes a positive meniscus lens L6 with a convex surface on the object side. The lens subgroup 2B G2B includes a cemented lens in which a bi-concave lens L7 and a bi-convex lens L8 are cemented, a cemented lens in which a bi-convex lens L9 and a negative meniscus lens L10 with a concave surface on the object side are cemented, a cemented lens in which a bi-convex lens L11 and a bi-concave lens L12 are cemented, and a bi-convex lens L13.

(2) Numerical Data Examples

Next, "Lens Data," "Specifications," and "Lens Group Data" will be described as Numerical Data Examples to which specific numerical values of the optical system are applied. FIG. 4 shows a longitudinal aberration diagram of the optical system at infinity focus.

| Surface NO. | (Lens Data) | | | | | | |
|---|---|---|---|---|---|---|---|
| | r | d | Nd | vd | θgF | θCT | θIR |
| 1 | 37.600 | 5.526 | 1.8040 | 46.53 | 0.56 | 0.77 | −0.39 |
| 2 | −3183.846 | 0.380 | | | | | |
| 3 | 122.865 | 1.400 | 1.5163 | 64.14 | 0.54 | 0.87 | −0.31 |
| 4 | 13.754 | 6.317 | | | | | |
| 5 | −47.140 | 1.200 | 1.9229 | 18.90 | 0.65 | 0.64 | −0.54 |
| 6 | 19.673 | 7.605 | | | | | |
| 7 | −87.937 | 1.200 | 1.5163 | 64.14 | 0.54 | 0.87 | −0.31 |
| 8 | 29.255 | 6.357 | 1.7995 | 42.22 | 0.57 | 0.75 | −0.41 |
| 9 | −29.338 | D(9) | | | | | |
| 10 | 25.625 | 5.400 | 1.8929 | 20.36 | 0.64 | 0.65 | −0.53 |
| 11 | 83.743 | D(11) | | | | | |
| 12 (Stop) | INS | 2.625 | | | | | |
| 13 | −42.892 | 1.000 | 1.7380 | 32.33 | 0.59 | 0.72 | −0.44 |
| 14 | 15.814 | 4.872 | 1.4970 | 81.54 | 0.54 | 0.83 | −0.35 |
| 15 | −25.453 | 0.400 | | | | | |
| 16 | 200.000 | 4.287 | 1.4970 | 81.54 | 0.54 | 0.83 | −0.35 |
| 17 | −12.498 | 1.000 | 1.8929 | 20.36 | 0.64 | 0.65 | −0.53 |
| 18 | −26.273 | 0.200 | | | | | |
| 19 | 41.159 | 5.048 | 1.5952 | 67.73 | 0.54 | 0.79 | −0.37 |
| 20 | −12.948 | 1.000 | 1.5174 | 52.20 | 0.56 | 0.82 | −0.35 |
| 21 | 19.477 | 1.326 | | | | | |
| 22 | 27.026 | 2.922 | 1.9037 | 31.34 | 0.60 | 0.70 | −0.47 |
| 23 | −142.591 | D(23) | | | | | |

| (Specifications) | | |
|---|---|---|
| | INF | 0.2 m |
| F | 16.00 | — |
| Fno | 1.60 | — |
| ω | 26.86 | — |
| D(9) | 2.863 | 1.819 |
| D(11) | 9.155 | 8.920 |
| D(23) | 17.773 | 19.052 |

| (Lens Group Data) | |
|---|---|
| F1 | −60.454 |
| F2 | 29.768 |
| F2A | 39.617 |
| F2B | 29.346 |

TABLE 1

| | | Example 1 | Example 2 | Example 3 |
|---|---|---|---|---|
| Conditional Expression (1) | θct | 0.815 | 0.815 | 0.815 |
| Conditional Expression (2) | vd | 52 | 52 | 52 |
| Conditional Expression (3) | n_pave | 1.62 | 1.62 | 1.62 |
| Conditional Expression (4) | vd_pae | 66 | 66 | 66 |
| Conditional Expression (5) | 0.00558 × vd_n2B + 0.531 − θct_n2B | −0.004 | −0.004 | −0.004 |
| Conditional Expression (5) | θgF_p2A | 0.639 | 0.639 | 0.639 |
| Conditional Expression (7) | θIRp − θIRn | 0.025 | 0.025 | 0.025 |
| Conditional Expression (8) | F2/F | 2.35 | 1.86 | 1.86 |
| Conditional Expression (9) | F2B/F | 2.36 | 1.84 | 1.83 |

The optical system according to the present invention can be preferably employed as, for example, an imaging optical system of an imaging device equipped with an image sensor such as an industrial camera (FA/MV), a video camera, a digital camera, and a security camera.

What is claimed is:

1. An optical system comprising:

in order from an object side to an image side, a first lens group having refractive power; and a second lens group having positive refractive power, wherein a variable distance that varies during focusing between the first lens group and the second lens group is closer to an object than a variable distance that varies during focusing between other lenses, the first lens group includes a positive lens and at least one or more negative lenses in order from the image side, and the second lens group includes a lens subgroup 2A having positive refractive power, an aperture stop, and a lens subgroup 2B having positive refractive power in order from the object side and also includes at least one or more negative lenses satisfying the following Conditional Expressions (1) and (2), the lens subgroup 2B including a negative lens and a positive lens in order from the object side, satisfying the following Conditional Expressions (3) and (4):

$$\theta ct \geq 0.800 \quad (1)$$

$$vd \leq 55 \quad (2)$$

$$nd\_pave < 1.70 \quad (3)$$

$$vd\_pave > 50 \quad (4)$$

where
θct is a partial dispersion ratio of a negative lens included in the second lens group at the wavelength of the C line to the wavelength of the t line,
the partial dispersion ratio θct at the wavelength of the C line to the wavelength of the t line being defined by the following Expression:

$$\theta ct = (nC - nt)/(nF - nC)$$

where nC is a refractive index at the wavelength of the C line,
nt is a refractive index at the wavelength of the t line,
nF is a refractive index at the wavelength of the F line,
vd is an Abbe number of a negative lens included in the second lens group at the wavelength of the d line,
nd_pave is an average refractive index of all positive lenses disposed in the lens subgroup 2B at the wavelength of the d line, and
vd_pave is an average Abbe number of all positive lenses disposed in the lens subgroup 2B at the wavelength of the d line.

2. The optical system according to claim 1, satisfying the following Conditional Expression:

$$-0.007 < 0.00558 \times vd\_n2B + 0.531 - \theta ct\_n2B < 0.000 \quad (5)$$

where
vd_n2B is an Abbe number of a negative lens disposed closest to the object side in the lens subgroup 2B at the wavelength of the d line, and
θct_n2B is a partial dispersion ratio of the negative lens disposed closest to the object side in the lens subgroup 2B at the wavelength of the C line to the wavelength of the t line.

3. The optical system according to claim 1, satisfying the following Conditional Expression:

$$0.623 < \theta gF\_p2A \quad (4)$$

where
θgF_p2A is a partial dispersion ratio of a positive lens disposed closest to the object side in the lens subgroup 2A at the wavelength of the g line to the wavelength of the F line,
the partial dispersion ratio θgF at the wavelength of the g line to the wavelength of the F line being defined by the following Expression:

$$\theta gF = (ng - nF)/(nF - nC)$$

where ng is a refractive index at the wavelength of the g line.

4. The optical system according to claim 1, satisfying the following Conditional Expression:

$$-0.050 < \theta IRp - \theta IRn < 0.050 \quad (5)$$

where
θIRp is an average of (nF−nd)/(n1700 nm−nd) of all positive lenses included in the second lens group,
θIRn is an average of (nF−nd)/(n1700 nm−nd) of all negative lenses included in the second lens group,
nd is a refractive index at the wavelength of the d line, and
n1700 nm is a refractive index at a wavelength of 1700 nm.

5. The optical system according to claim 1, satisfying the following Conditional Expression:

$$1.50 < F2/F < 2.60 \quad (6)$$

where
F2 is a focal length of the second lens group at the wavelength of the d line, and
F is a focal length of the optical system at the wavelength of the d line.

6. The optical system according to claim 1, satisfying the following Conditional Expression:

$$1.50 < F2B/F < 2.60 \quad (7)$$

where
F2B is a focal length of the lens subgroup 2B at the wavelength of the d line.

7. The optical system according to claim 1, wherein the second lens group is moved along an optical axis or the lens subgroup 2A and the lens subgroup 2B are moved along the optical axis on different paths to focus from an object at infinity to an object at a short distance.

8. The optical system according to claim 1, wherein the first lens group includes a positive lens on the side closest to the object side.

9. An imaging device comprising the optical system according to claim 1; and an image sensor configured to convert an optical image formed by the optical system into an electrical signal on the image side of the optical system.

* * * * *